US008903880B2

(12) United States Patent
Takeda et al.

(10) Patent No.: US 8,903,880 B2
(45) Date of Patent: Dec. 2, 2014

(54) TRAJECTORY GENERATION SYSTEM AND TRAJECTORY GENERATION METHOD

(75) Inventors: Masanori Takeda, Wako (JP); Chiaki Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 283 days.

(21) Appl. No.: 13/495,549

(22) Filed: Jun. 13, 2012

(65) Prior Publication Data

US 2012/0331027 A1 Dec. 27, 2012

(30) Foreign Application Priority Data

Jun. 27, 2011 (JP) ................................. 2011-141525

(51) Int. Cl.
*G06F 7/38* (2006.01)
*A63H 11/00* (2006.01)
*G05D 1/02* (2006.01)

(52) U.S. Cl.
CPC ...... *G06F 7/38* (2013.01); *A63H 11/00* (2013.01); *G05D 1/0212* (2013.01)
USPC ........................................................ 708/443

(58) Field of Classification Search
CPC ..... G06F 17/13; G06F 17/5018; G01D 3/028; G01P 15/16; G01P 3/42
USPC ........................................................ 708/443
See application file for complete search history.

(56) References Cited

U.S. PATENT DOCUMENTS

| 7,379,789 B2 * | 5/2008 | Takenaka et al. ............. 700/245 |
| 2005/0080495 A1 * | 4/2005 | Tessier et al. .................. 700/63 |
| 2010/0168919 A1 * | 7/2010 | Okamoto ....................... 700/275 |

FOREIGN PATENT DOCUMENTS

| JP | 02-181201 | 7/1990 |
| JP | 05-324115 | 12/1993 |
| JP | 3640255 | 1/2005 |
| JP | 2007-007795 | 1/2007 |
| JP | 2009-172721 | 8/2009 |
| JP | 2011-079092 | 4/2011 |
| WO | 03/057429 | 7/2003 |

OTHER PUBLICATIONS

Japanese Office Action dated Aug. 19, 2014, 3 pages.

* cited by examiner

*Primary Examiner* — Tan V. Mai
(74) *Attorney, Agent, or Firm* — Rankin, Hill & Clark LLP (57) ABSTRACT

A specified function p is generated to satisfy a first condition that an integral value of an evaluation function over a specified period is minimal. The evaluation function denotes a magnitude of an absolute value of a third order specified function $p^{(3)}(t)$. Moreover, the specified function p is generated to satisfy a second condition that a value of a second order specified function $p^{(2)}(t)$ is limited within a limiter range $[p^{(2)}\text{min\_c}, p^{(2)}\text{max\_c}]$.

4 Claims, 5 Drawing Sheets

TRAJECTORY GENERATION SYSTEM AND TRAJECTORY GENERATION METHOD

BACKGROUND OF THE INVENTION

1. Field of the Invention

The present invention relates to a trajectory generation system and a trajectory generation method for generating a trajectory defined by a temporal function.

2. Related Background Art

There has been disclosed a dead beat filter for generating a function so as to match a value of the function with a desired value at a specified time (refer to Japanese Patent No. 3233450). Such filter has been applied in the generation of a desired trajectory of each spatial component of positions and postures of each foot of a humanoid robot (refer to Japanese Patent No. 3640255).

According to the filter, even though the desired value of the function is varied, by adjusting the value of a time constant, a smooth trajectory can be generated to match the value of the function with the varied desired value at the specified time.

SUMMARY OF THE INVENTION

However, according to the filter, the trajectory of temporal differentiation values of the function may become discrete in case that the specified time is varied. For example, if the specified time at which a foot contacts the ground is varied while the robot is walking, it is possible that at least one trajectory of a velocity or acceleration of the foot will become discrete for the components in the vertical direction.

The present invention has been accomplished in view of the aforementioned problems, and it is therefore an object of the present invention to provide a trajectory generation system which maintains the smoothness of a temporal differentiation function of a specified function while allowing variation of a specified time so as to match a value of the specified function with a desired value in generating a trajectory defined by the specified function.

A trajectory generation system for generating a trajectory defined by a specified function which reaches a desired value at a specified time according to the present invention comprises: a first trajectory generating element configured to set variably the specified time; and a second trajectory generating element configured to generate the specified function in a specified period from an initial time to a terminal time set by the first trajectory generating element as a newest specified time under a first condition that an integral value of an evaluation function indicating a magnitude of an absolute value of a third order temporal differentiation function of the specified function over the specified period becomes minimal.

According to the trajectory generation system of the present invention, the specified function is generated so as to satisfy the first condition that the integral value of the evaluation function over the specified period is minimal. The evaluation function denotes the magnitude of an absolute value of the third order temporal differentiation function of the specified function; therefore, that the integral value thereof is minimal means the smoothness of a second order temporal differentiation function, a first order temporal differentiation function of the specified function and the specified function over the specified period is maintained.

Therefore, a smooth trajectory defined by the specified function can be generated, so that the smoothness of trajectories defined respectively by the first order and the second order temporal differentiation functions of the specified function are maintained while allowing the variation of the specified time.

It is preferable that the second trajectory generating element is configured to generate the specified function under a second condition that a value of a second order temporal differentiation function of the specified function is limited within an allowable range in addition to the first condition.

According to the trajectory generation system having the mentioned configuration, such trajectory of the specified function is prevented from being generated as to instruct a control subject, the motions of which are controlled according to the generated trajectory, to move beyond the performance thereof.

It is preferable that the first trajectory generating element is configured to set a variable range for the desired value of the specified function at the specified time under the first condition and the second condition; and the second trajectory generating element is configured to generate the specified function so as to constrain the desired value of the specified function at the specified time into the variable range set by the first trajectory generating element.

According to the trajectory generation system having the mentioned configuration, a trajectory defined by the specified function can be generated to maintain the smoothness of the trajectories defined respectively by the first order and the second order temporal differentiation functions of the specified function while allowing appropriate variation of the desired value in addition to the variation of the specified time.

It is preferable that the first trajectory generating element is configured to set the terminal time to satisfy a third condition that, after the variable range at the terminal time is set, the variable range and the specified range of the desired value are at least partially overlapped.

According to the trajectory generation system having the mentioned configuration, a trajectory defined by the specified function can be generated to maintain the smoothness of a trajectory defined by the temporal differentiation function of the specified function while allowing the variation of the terminal time (specified time) so as to match the specified function at the specified time with the desired valued contained in the specified range.

DETAILED DESCRIPTION OF THE PREFERRED EMBODIMENTS

Configuration of Trajectory Generation System

Figure 1:
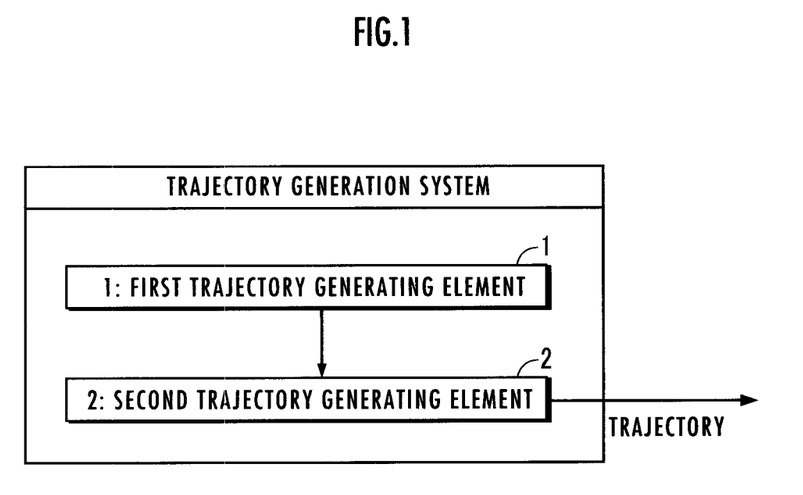
FIG. 1 is an explanatory diagram illustrating a configuration of a trajectory generation system of the present invention.

A trajectory generation system illustrated in FIG. 1 as an embodiment of the present invention is composed of a computer. The trajectory generation system includes a first trajectory generating element 1 and a second trajectory generating element 2.

It is acceptable that all constituent elements of the trajectory generation system are constructed from physically common hardware resources or from physically separate hardware resources. For example, it is acceptable that the second trajectory generating element 2 is constructed from a computer constituting a control subject whose motions are controlled according to a generated trajectory while the first trajectory generating element 1 is constructed from another computer different from the control subject.

To simplify the descriptions, an nth order temporal differentiation function of a specified function p(t) is denoted as "nth order specified function $p^{(n)}(t)$". For example, in the case of using the specified function p(t) to denote the position of each foot of a humanoid robot described in the Patent Document 2, a first order specified function $p^{(1)}(t)$ denotes a foot velocity, a second order specified function $p^{(2)}(t)$ denotes a foot acceleration, and a third order specified function $p^{(3)}(t)$ denotes a foot jerking degree. In the case of using the specified function p(t) to denote the angle of a joint such as the knee joint or the like of the humanoid robot, the first order specified function $p^{(1)}(t)$ denotes a joint angular velocity, the second order specified function $p^{(2)}(t)$ denotes a joint angular acceleration, and the third order specified function $p^{(3)}(t)$ denotes a joint angular jerking degree.

The first trajectory generating element 1 is configured to variably set a specified time (terminal time). The first trajectory generating element 1 is configured to set a variable range [pmin_c, pmax_c] of a desired value of the specified function p(t) at a specified time $t_2$ under a first condition and a second condition which will be described hereinafter.

The second trajectory generating element 2 is configured to generate the specified function p(t) at least in a specified period 1 $[t_1, t_2]$ from an initial time $t_1$ to the terminal time $t_2$ under the first condition that an integral value of an evaluation function indicating a magnitude of an absolute value of the third order specified function $p^{(3)}(t)$ over the specified period is minimal. The second trajectory generating element 2 is configured to generate the specified function p(t) under the second condition that the value of the second order specified function $p^{(2)}(t)$ is restricted within an allowable range [$p^{(2)}$min_c, $p^{(2)}$max_c] in addition to the first condition. The second trajectory generating element 2 is configured to generated the specified function p(t) so as to constrain the desired value $p_T$ of the specified function p(t) at the specified time into the variable range [pmin_c, pmax_c] set by the first trajectory generating element 1.

That an constituent element of the present invention is configured to perform a responsible arithmetic computation process means that the CPU constituting the trajectory generation system is programmed to retrieve a trajectory generation program (software) from a storing device, and perform the responsible arithmetic computation process according to the retrieved trajectory generation program.

Various apparatuses such as a robot, a vehicle and the like serves as a control subject and the motions thereof can be controlled according to a trajectory defined by the specified function p(t) generated by the trajectory generation system.

(Functions of the Trajectory Generation System)

Figure 2:
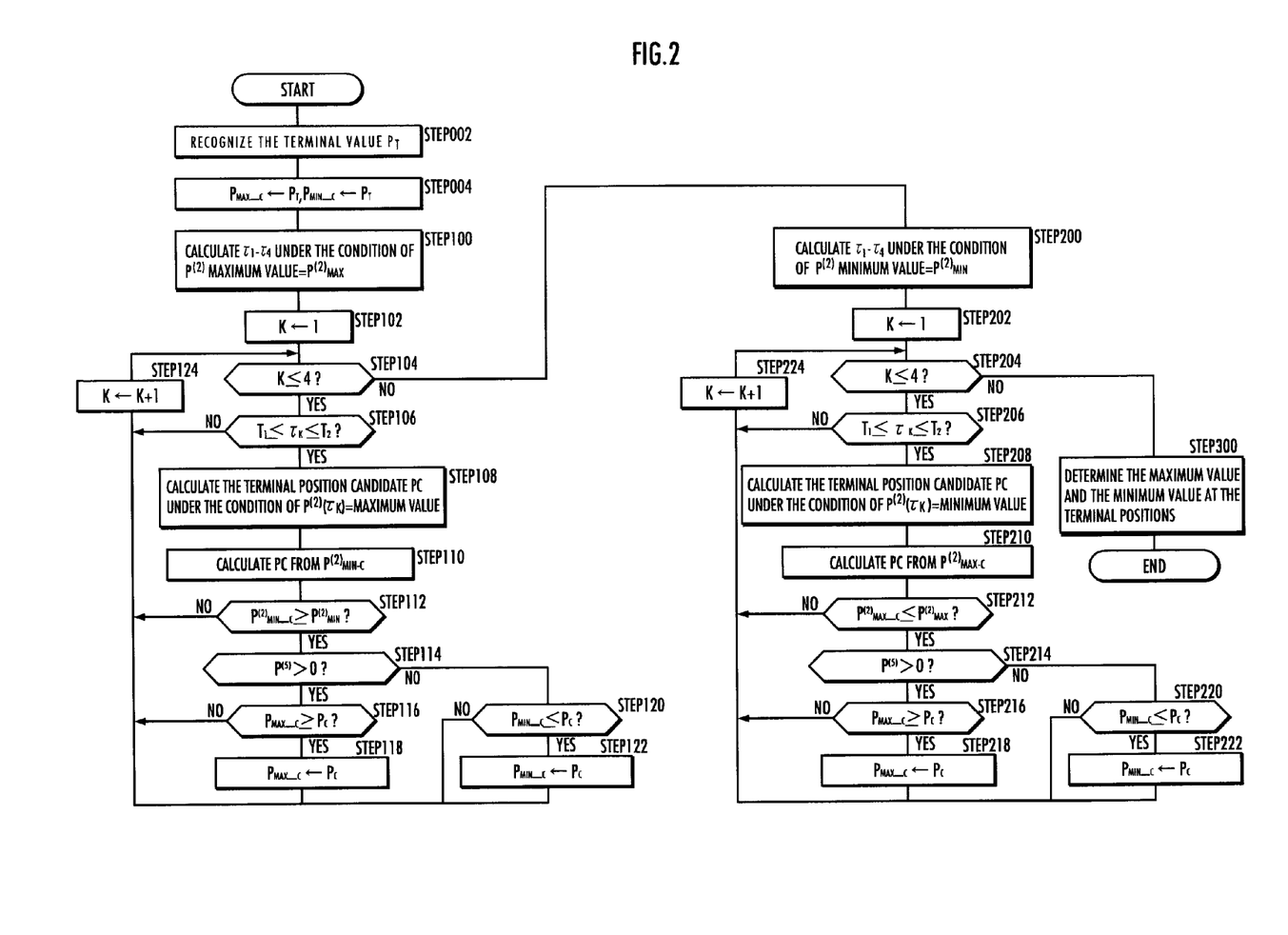
FIG. 2 is an explanatory diagram illustrating a trajectory generation method of the present invention.
Figure 3:
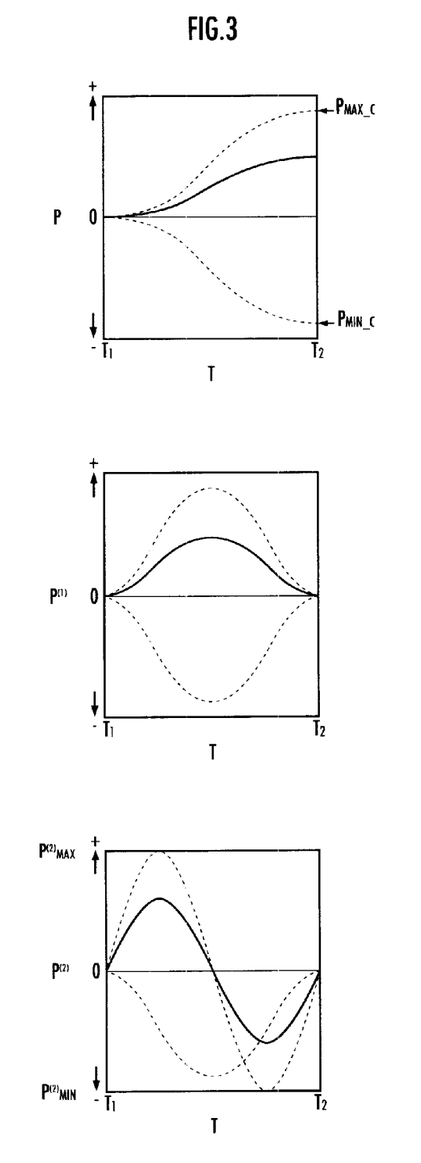
FIG. 3 is an explanatory diagram illustrating an example 1 of generating a trajectory of a position, a velocity and an acceleration.
Figure 4:
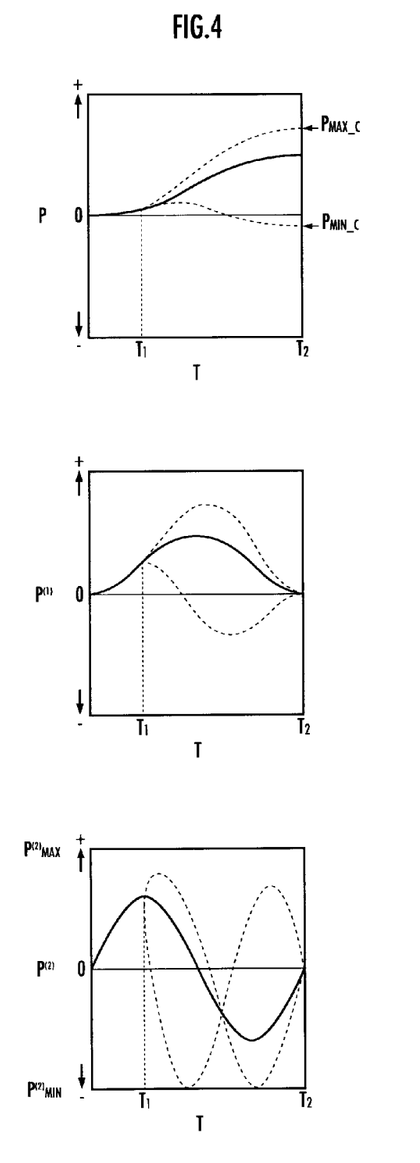
FIG. 4 is an explanatory diagram illustrating an example 2 of generating a trajectory of a position, a velocity and an acceleration.
Figure 5:
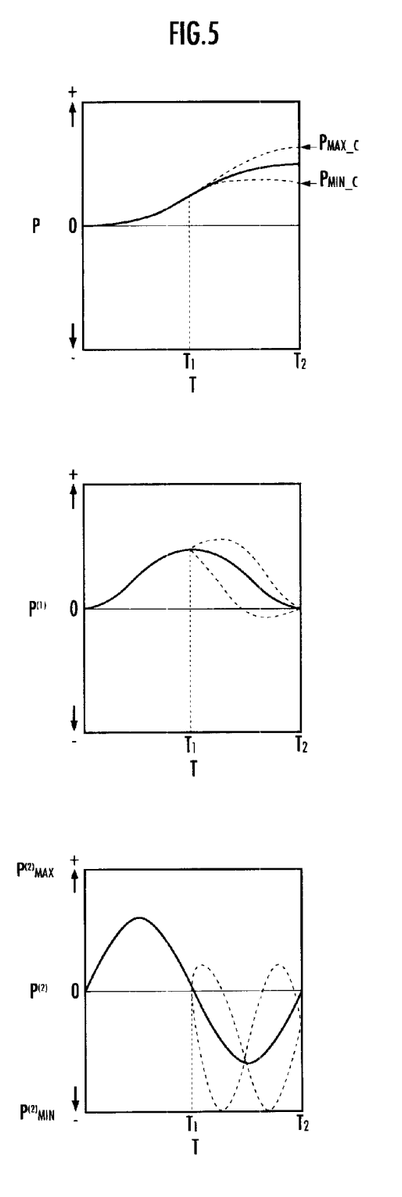
FIG. 5 is an explanatory diagram illustrating an example 3 of generating a trajectory of a position, a velocity and an acceleration.
Figure 6:
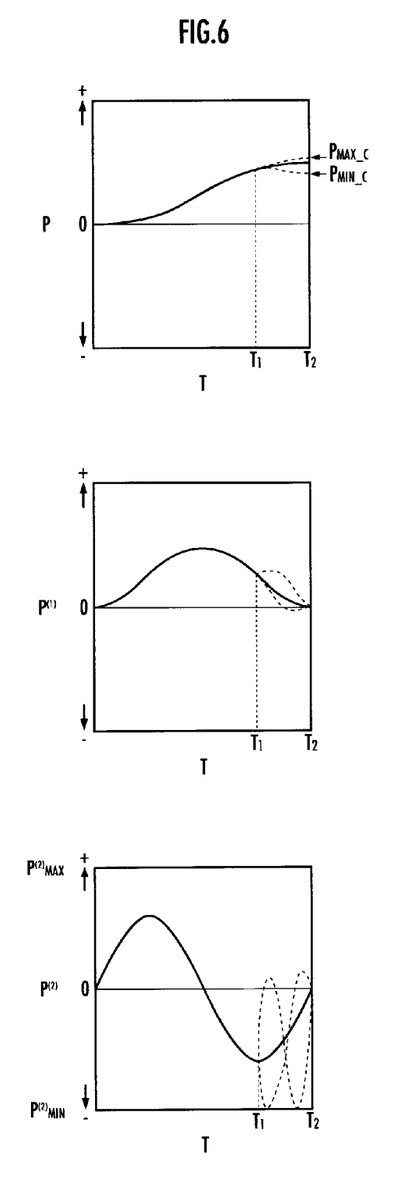
FIG. 6 is an explanatory diagram illustrating an example 4 of generating a trajectory of a position, a velocity and an acceleration.

Firstly, the desired terminal value $p_T$ of the specified function p(t) is recognized (FIG. 2/STEP 002). The terminal value $p_T$ may be variably set according to a state of the control subject measured by a sensor, for example. Accordingly, each of the upper limit value pmax_c and the lower limit value pmin_c of the specified function p(t) at the terminal time $t_2$ is initialized to the terminal value $p_T$ (FIG. 2/STEP 004).

The terminal time $t_2$ may be variably set by the first trajectory generating element 1. For example, the terminal time $t_2$ serving as the landing timing may be varied in response to a request to have a foot of a humanoid robot serving as the control subject to land on ground at an early timing or a late timing from the viewpoint of stabilizing the posture thereof or the like.

Subsequently, under such a condition as to match the maximum value of the second order specified function $p^{(2)}(t)$ to the upper limit value $p^{(2)}$max, four extreme times $\tau_1$ to $\tau_4$ where the second order specified function $p^{(2)}(t)$ has extreme values are calculated (FIG. 2/STEP 100).

Specifically, under the condition that the maximum value of the second order specified function $p^{(2)}(t)$ matches with the upper limit value $p^{(2)}$ max of the limiter at an extreme time $\tau$, a time $t=\tau$ where the second order specified function $p^{(2)}(t)$ having an extreme value is obtained according to the equation (1).

$$d^3 f(t)/dt^3 = 0 \quad (1)$$

Herein, f(t) denotes a function trajectory for minimizing the evaluation function over the specified period $[t_1, t_2]$. The evaluation function is a function indicating the magnitude of an absolute value of the third order specified function $p^{(3)}(t)$ and is defined by, for example, the third order specified function $p^{(3)}(t)$ or a squared norm thereof. By using the function trajectory f(t), the trajectory of the specified function p(t) is generated to satisfy the first condition that the integral value of the evaluation function over the specified period is minimal.

The function trajectory f(t) is defined by the expression (2) on the basis of a time interval T ($=t_2-t_1$) of the specified period $[t_1, t_2]$, an initial value $p(t_1)=p_0$ of the specified function p(t), an initial value $p^{(1)}(t_1)=p^{(1)}{}_0$ of the first order specified function, an initial value $p^{(2)}(t_1)=p^{(2)}{}_0$ of the second order specified function, a terminal value $p(t_2)=p_T$ of the specified function p, a terminal value $p^{(1)}(t_2)=p^{(1)}{}_T$ of the first order specified function, and a terminal value $p^{(2)}(t_2)=p^{(2)}{}_T$ of the second order specified function.)

$$p^{(0)} = f(t) = m_5 t^5 + m_4 t^4 + m_3 t^3 + (1/2) p^{(2)}{}_0 t^2 + p^{(1)}{}_0 t + p_0,$$

$$m_5 = -\{12(p_0-p_T) + 6(p^{(1)}{}_0 + p^{(1)}{}_T)T + (p^{(2)}{}_0 - p^{(2)}{}_T)T^2\}/2T^5,$$

$$m_4 = \{30(p_0-p_T) + (16 p^{(1)}{}_0 + 14 p^{(1)}{}_T)T + (3 p^{(2)}{}_0 - 2 p^{(2)}{}_T)T^2\}/2T^4,$$

$$m_3 = -\{20(p_0-p_T) + (12 p^{(1)}{}_0 + 8 p^{(1)}{}_T)T + (3 p^{(2)}{}_0 - p^{(2)}{}_T)T^2\}/2T^3 \quad (2)$$

By deforming the equation (1) so as to cancel the terminal value $p_T$ of the specified function p(t) under the mentioned condition, a quartic equation (4) of the extreme time $\tau$ is derived.

$$M_4 \tau^4 + M_3 \tau^3 + M_2 \tau^2 + M_1 \tau + M_0 = 0,$$

$$M_4 = 12(p^{(1)}{}_0 - p^{(1)}{}_T) + 6T(p^{(2)}{}_0 + p^{(2)}{}_T),$$

$$M_3 = 24T(p^{(1)}{}_T - p^{(1)}{}_0) - 8T^2(2p^{(2)}{}_0 + P^{(2)}{}_T),$$

$$M_2=12T^2(p^{(1)}{}_0-p^{(1)}{}_T)+3T^3(5p^{(2)}{}_0+p^{(2)}{}_T-2p^{(2)}\text{max}),$$

$$M_1=6T^4(p^{(2)}\text{max}-p^{(2)}{}_0),$$

$$M_0=T^5(-p^{(2)}\text{max}+p^{(2)}{}_0) \quad (4)$$

By solving the quartic equation (4), the four extreme times $\tau=\tau_1$ to $\tau_4$ are obtained.

An index k denoting each of the four extreme times of $\tau_1$ to $\tau_4$ is set at "1" (FIG. 2/STEP 102). Thereafter, whether the index k is equal to or smaller than 4 is determined (FIG. 2/STEP 104).

If it is determined that the index k is equal to or smaller than 4 (FIG. 2/STEP 104 . . . YES), whether a time $\tau_k$ is contained in the specified period $[t_1, t_2]$ is determined (FIG. 2/STEP 106). Such determination is performed to avoid the generation of an inappropriate second order specified function trajectory $p^{(2)}(t)$ having an extreme value at a time beyond the specified period $[t_1, t_2]$.

If it is determined that the time $\tau_k$ is contained in the specified period $[t_1, t_2]$ (FIG. 2/STEP 106 . . . YES), a terminal value candidate pc of the specified function p is calculated on an assumption that the second order specified function $p^{(2)}(t)$ has a maximum value at the time $\tau_k$ (FIG. 2/STEP 108). The minimum value $p^{(2)}$min_c of the second order specified function $p^{(2)}(t)$ is calculated under the condition that the terminal value candidate pc of the specified function is used as the terminal value $p_T$ (FIG. 2/STEP 110).

Thereafter, whether the minimum value $p^{(2)}$min_c of the second order specified function $p^{(2)}(t)$ is equal to or greater than the lower limit value $p^{(2)}$min is determined (FIG. 2/STEP 112). Such determination is performed to avoid the generation of such a second order specified function $p^{(2)}(t)$ that the minimum value of the second order specified function $p^{(2)}(t)$ is smaller than the lower limit value $p^{(2)}$min of the limiter. In other words, the determination is equivalent to a sufficiency determination of the second condition that the value of the second order specified function $p^{(2)}(t)$ is restricted within the limiter range (allowable range).

If it is determined that the minimum value $p^{(2)}$min_c of the second order specified function $p^{(2)}(t)$ is equal to or greater than the lower limit value $p^{(2)}$min of the limiter (FIG. 2/STEP 112 . . . YES), whether a fifth order specified function trajectory $p^{(5)}(t)$ is positive is determined (FIG. 2/STEP 114).

If it is determined that the fifth order specified function trajectory $p^{(5)}(t)$ is positive (FIG. 2/STEP 114 . . . YES), whether a maximum value candidate pmax_c of the specified function p(t) is equal to or greater than the terminal value candidate pc is determined (FIG. 2/STEP 116). If it is determined that the maximum value candidate pmax_c of the specified function p(t) is equal to or greater than the terminal value candidate pc (FIG. 2/STEP 116 . . . YES), the maximum value candidate pmax_c is set as the terminal value candidate pc (FIG. 2/STEP 118).

On the other hand, if it is determined that the fifth order specified function trajectory $p^{(5)}(t)$ is not positive (FIG. 2/STEP 114 . . . NO), whether a minimum value candidate pmin_c of the specified function p(t) is equal to or smaller than the terminal value candidate pc is determined (FIG. 2/STEP 120). If it is determined that the minimum value candidate pmin_c of the specified function p(t) is equal to or smaller than the terminal value candidate pc (FIG. 2/STEP 120 . . . YES), the minimum value candidate pmin_c is set as the terminal value candidate pc of the specified function p(t) (FIG. 2/STEP 122).

Thereafter, the process after STEP 120 is repeated (refer to FIG. 2/STEP 104 to 122) after the value of the index k is increased by 1 only (FIG. 2/STEP 124).

Also, in the following case, a series of processes after the comparison to the value of the index k is repeated (refer to FIG. 2/STEP 104 to 120) after the value of the index k is increased by 1 only (FIG. 2/STEP 122). Specifically, the case where the time $\tau_k$ is determined to be beyond the specified period $[t_1, t_2]$ (FIG. 2/STEP 106 . . . NO), the case where the minimum value candidate $p^{(2)}$min_c of the second order specified function $p^{(2)}(t)$ is determined to be smaller than the lower limit value $p^{(2)}$min (FIG. 2/STEP 112 . . . NO), the case where the maximum value candidate pmax_c of the specified function p(t) is determined to be smaller than the terminal value candidate pc (FIG. 2/STEP 116 . . . NO), or the case where the minimum value candidate pmin_c of the specified function p(t) is determined to be greater than the terminal value candidate pc (FIG. 2/STEP 120 . . . NO).

If it is determined that the index k is greater than 4 (FIG. 2/STEP 104 . . . NO), the four extreme times of $T_1$ to $T_4$ where the second order specified function $p^{(2)}(t)$ having the extreme values are calculated under such a condition that the minimum value of the second order specified function $p^{(2)}(t)$ matches with the lower limit value $p^{(2)}$min (FIG. 2/STEP 200).

Under the condition that the minimum value of the second order specified function $p^{(2)}(t)$ matches with the lower limit value $p^{(2)}$min of the limiter, the times $\tau_1$ and $\tau_2$ where the second order specified function $p^{(2)}(t)$ having extreme values are calculated according to the equation (2). Moreover, the quartic equation of the extreme time $\tau_1$ is derived by cancelling the terminal value $p_T$.

By solving the quartic equation, the four extreme times $\tau_1$ to $\tau_4$ are calculated so as to satisfy the condition that the minimum value of the second order specified function $p^{(2)}(t)$ is not smaller than the lower limit value $p^{(2)}$min of the limiter.

The index k denoting each of the four extreme times of $\tau_1$ to $\tau_4$ is initialized to "1" (FIG. 2/STEP 202). Thereafter, whether the index k is equal to or smaller than 4 is determined (FIG. 2/STEP 204).

If it is determined that the index k is equal to or smaller than 4 (FIG. 2/STEP 204 . . . YES), whether the extreme time $\tau_k$ is contained in the specified period $[t_1, t_2]$ is determined (FIG. 2/STEP 206). Such determination is performed to avoid the generation of an inappropriate second order specified function trajectory having an extreme value at a time beyond the specified period $[t_1, t_2]$.

If it is determined that the extreme time $\tau_k$ is contained in the specified period $[t_1, t_2]$ (FIG. 2/STEP 206 . . . YES), the terminal value candidate pc of the specified function p(t) is calculated on an assumption that the second order specified function $p^{(2)}(t)$ has a minimum value at the time $\tau_k$ (FIG. 2/STEP 208). The maximum value $p^{(2)}$max_c of the second order specified function is calculated under the condition that the terminal value candidate pc of the specified function p(t) matches with the terminal value $p_T$ (FIG. 2/STEP 210).

Thereafter, whether the maximum value $p^{(2)}$max_c of the second order specified function $p^{(2)}(t)$ is equal to or smaller than the upper limit value $p^{(2)}$max of the limiter is determined (FIG. 2/STEP 212). Such determination is performed to avoid the generation of such second order specified function $p^{(2)}(t)$ that the maximum value thereof is greater than the upper limit value $p^{(2)}$max of the limiter. In other words, the determination is equivalent to the sufficiency determination of the second condition that the value of the second order specified function $p^{(2)}(t)$ is restricted within the limiter range (allowable range).

If it is determined that the maximum value $p^{(2)}$max_c of the second order specified function $p^{(2)}(t)$ is equal to or smaller than the upper limit value $p^{(2)}$max (FIG. 2/STEP 212 . . .

YES), whether the fifth order specified function trajectory $p^{(5)}(t)$ is positive is determined (FIG. 2/STEP 214).

If it is determined that the fifth order specified function trajectory $p^{(5)}(t)$ is positive (FIG. 2/STEP 214 ... YES), whether the maximum value candidate pmax_c of the specified function p(t) is equal to or greater than the terminal value candidate pc is determined (FIG. 2/STEP 216). If it is determined that the maximum value candidate pmax_c of the specified function p(t) is equal to or greater than the terminal value candidate pc (FIG. 2/STEP 216 ... YES), the terminal value candidate pc is set as the maximum value candidate pmax_c (FIG. 2/STEP 218).

On the other hand, if it is determined that the fifth order specified function trajectory $p^{(5)}(t)$ is not positive (FIG. 2/STEP 214 ... NO), whether the minimum value candidate pmin_c of the specified function p(t) is equal to or smaller than the terminal value candidate pc is determined (FIG. 2/STEP 220). If it is determined that the minimum value candidate pmin_c is equal to or smaller than the terminal value candidate pc (FIG. 2/STEP 220 ... YES), the terminal value candidate pc is set as the minimum value candidate pmin_c (FIG. 2/STEP 222).

Thereafter, a series of processes after the comparison to the value of the index k is repeated (refer to FIG. 2/STEP 204 to 222) after the value of the index k is increased by 1 only (FIG. 2/STEP 224).

Also, in the following case, a series of processes after the comparison to the index k is repeated (refer to FIG. 2/STEP 204 to 222) after the value of the index k is increased by 1 only (FIG. 2/STEP 224). Specifically, the case where the extreme time $\tau_k$ is determined to be beyond the specified period $[t_1, t_2]$ (FIG. 2/STEP 206 ... NO), the case where the maximum value candidate $p^{(2)}$max_c of the second order specified function $p^{(2)}(t)$ is determined to be greater than the upper limit value $p^{(2)}$max (FIG. 2/STEP 212 ... NO), the case where the maximum value candidate pmax_c of the specified function p(t) is determined to be smaller than the terminal value candidate pc (FIG. 2/STEP 216 ... NO), or the case where the minimum value candidate pmin_c of the specified function p is determined to be greater than the terminal value candidate pc (FIG. 2/STEP 220 ... NO).

If it is determined that the index k is greater than 4 (FIG. 2/STEP 204 ... NO), the maximum value of the terminal value $p_T$ satisfying the second condition is determined as pmax_c and the minimum value thereof is determined as pmin_c (FIG. 2/STEP 300).

The solid lines in the upper section, the middle section and the lower section of FIG. 3 to FIG. 6 illustrate the initial specified function trajectory p(t), the first order specified function trajectory $p^{(1)}(t)$ and the second order specified function trajectory $p^{(2)}(t)$, respectively. Each trajectory is defined under such a restricting condition that the initial value $p_0$, the initial value $p^{(1)}{}_0$ of the first order specified function, the initial value $p^{(2)}{}_0$ of the second order specified function, the terminal value $p^{(1)}{}_T$ of the first order specified function, and the terminal value $p^{(2)}{}_T$ of the second order specified function are equal to zero.

In each of the drawings from FIG. 3 to FIG. 6, when each time t=0, 0.25 T, 0.50 T and 0.75 T is set as the initial time $t=t_1$, a pair of the specified function trajectories p(t), a pair of the first order specified function trajectories $p^{(1)}(t)$ and a pair of the second order specified function trajectories $p^{(2)}(t)$ modified so as to satisfy the first and the second conditions are illustrated respectively by the dashed lines.

As obviously viewed from the upper section in each of the drawings from FIG. 3 to FIG. 6, the interval (terminal value variable range (=pmax_c−pmin_c)) between the pair of the specified function trajectories modified under the second condition at the terminal time $t=t_2$ becomes narrower as the remaining time to the terminal time $t=t_2$ becomes shorter.

Figure 7:
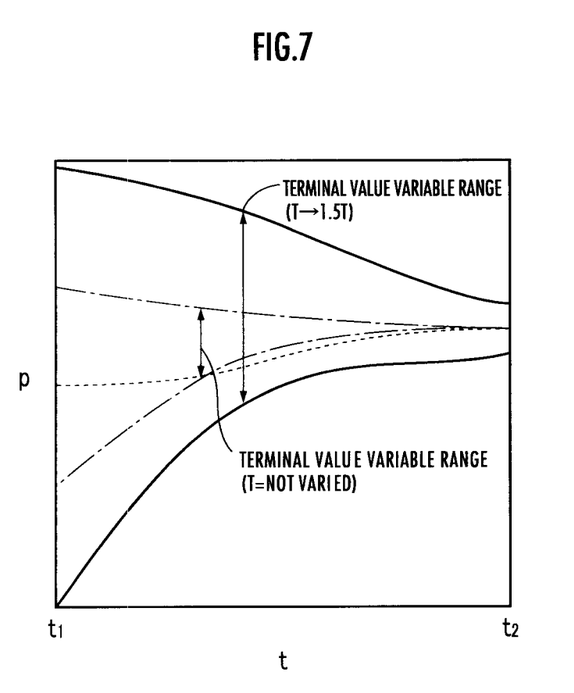
FIG. 7 is an explanatory diagram illustrating a variable range of a desired value.

In FIG. 7, the initial specified function trajectory p(t) is illustrated by a dashed line; when the specified period T is not varied, the specified function trajectories p(t) modified so as to satisfy the second condition are illustrated by a pair of chain lines. When the length of the specified period T is varied to 1.5 times thereof, the specified function trajectories p(t) modified so as to satisfy the second condition are illustrated by a pair of solid lines.

As obviously viewed from FIG. 7, the width of the terminal value variable range satisfying the second condition varies according to the length of the specified period T.

The specified function p is generated by the second trajectory generating element 2 so as to match the terminal value $p(t_2)$ of the specified function p(t) with the desired terminal value $p_T$ or to restrict it within the variable range [pmin_c, pmax_c] set by the first trajectory generating element 1.

(Effects of the Trajectory Generation System of the Present Invention)

According to the trajectory generation system of the present invention, the specified function p is generated so as to satisfy the first condition that the integral value of the evaluation function over the specified period is minimal (refer to FIG. 2/STEP 100, STEP 200, and the expression (2)). As aforementioned, the evaluation function denotes the magnitude of an absolute value of the third order specified function $p^{(3)}(t)$, therefore, that the integral value thereof is minimal means that the smoothness of the second order specified function $p^{(2)}(t)$, the first order specified function $p^{(1)}(t)$ and the specified function p(t) over the specified period $[t_1, t_2]$ is maintained.

Moreover, in addition to the first condition, the specified function p(t) is generated so as to satisfy the second condition that the value of the second specified function $p^{(2)}(t)$ is restricted within the limiter range [$p^{(2)}$min_c, $p^{(2)}$max_c] (refer to FIG. 2/STEP 112 and STEP 212).

Therefore, a smooth trajectory p(t) defined by the specified function p can be generated, so that the smoothness of trajectories defined by the first order specified function trajectory $p^{(1)}(t)$ and the second order specified function trajectory $p^{(2)}(t)$ are maintained while allowing the variation of the specified time $t_2$ (refer to FIG. 3 to FIG. 6). Further, such trajectory of the specified function p(t) is prevented from being generated as to instruct the control subject, the motions of which are controlled according to the generated trajectory p(t), to move beyond the performance thereof.

Another Embodiment of the Present Invention

It is acceptable that the first trajectory generating element 1 is configured to set at least one of the initial time $t_1$ and the terminal time $t_2$ so as to satisfy the third condition that after the variable range [pmin_c, pmax_c] is set in the case where at least one of the initial time $t_1$ and the terminal time $t_2$ is different, the variable range and a specified range of the desired value $p_T$ defined according to a motion plan or the like of the control subject are at least partially overlapped.

According to the trajectory generation system having the mentioned configuration, the specified function trajectory p(t) can be generated to maintain the smoothness of the first order specified function trajectory $p^{(1)}(t)$ and the second order specified function trajectory $p^{(2)}(t)$ while allowing the variation of at least one of the initial time $t_1$ and the terminal time (specified time) $t_2$ so as to match the specified function p(t) at the specified time $t_2$ with the desired valued $p_T$ contained in the specified range.

The invention claimed is:

1. A trajectory generation system for generating a trajectory defined by a specified function which reaches a desired value at a specified time, comprising:
   a first trajectory generating element configured to set variably the specified time; and
   a second trajectory generating element configured to generate the specified function in a specified period from an initial time to a terminal time set as a newest specified time by the first trajectory generating element under a first condition that an integral value of an evaluation function indicating a magnitude of an absolute value of a third order temporal differentiation function of the specified function over the specified period becomes minimal.

2. The trajectory generation system according to claim 1, wherein
   the second trajectory generating element is configured to generate the specified function under a second condition that a value of a second order temporal differentiation function of the specified function is limited within an allowable range in addition to the first condition.

3. The trajectory generation system according to claim 2, wherein
   the first trajectory generating element is configured to set a variable range for the desired value of the specified function at the specified time under the first condition and the second condition; and
   the second trajectory generating element is configured to generate the specified function so as to constrain the desired value of the specified function at the specified time into the variable range set by the first trajectory generating element.

4. The trajectory generation system according to claim 3, wherein
   the first trajectory generating element is configured to set the terminal time to satisfy a third condition that, after the variable range at the terminal time is set, the variable range and the specified range of the desired value are at least partially overlapped.

* * * * *